Patented Sept. 12, 1939

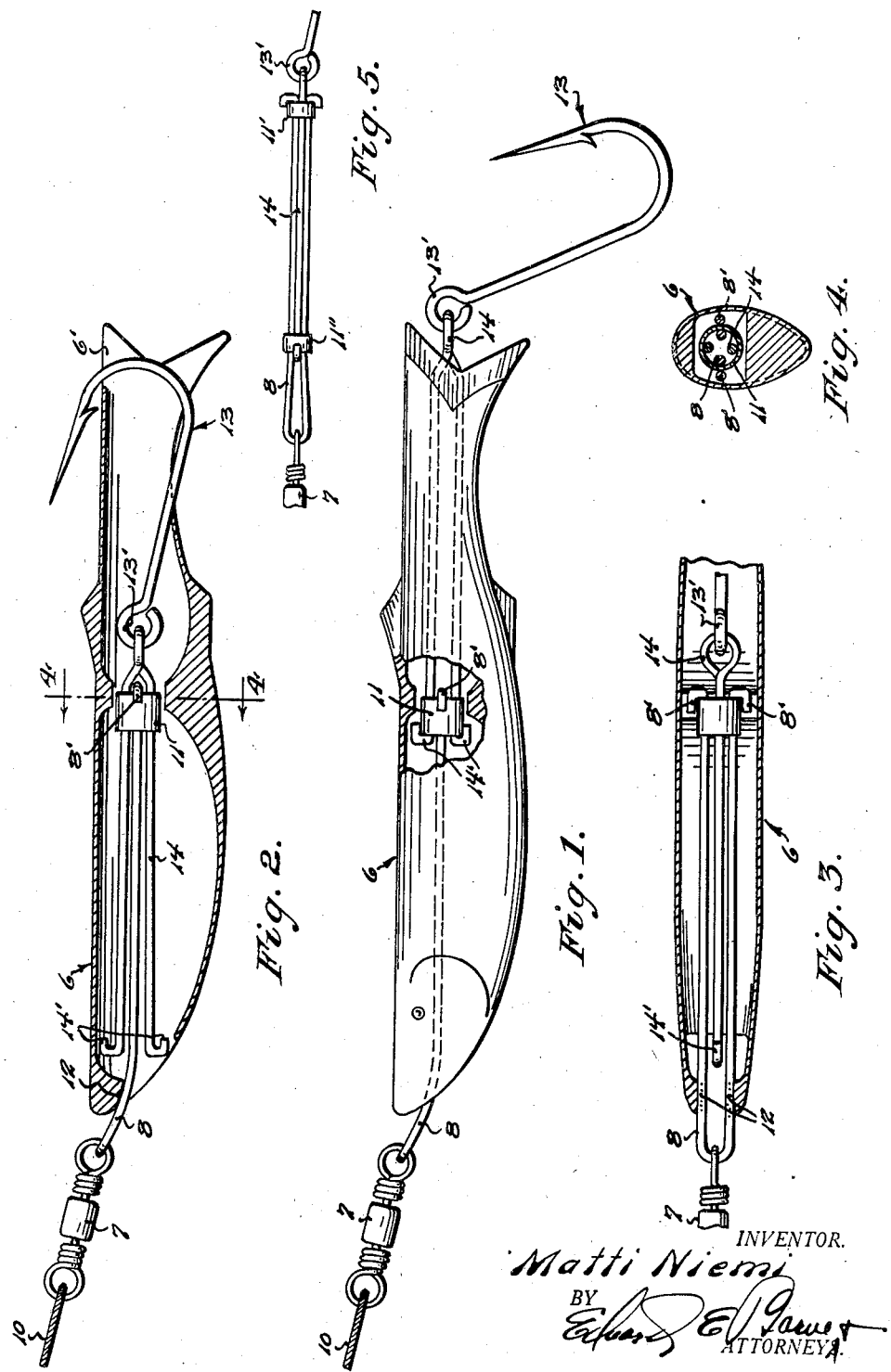

2,172,889

UNITED STATES PATENT OFFICE 2,172,889

FISH LURE

Matti Niemi, Seattle, Wash.

Application February 28, 1938, Serial No. 193,013

6 Claims. (Cl. 43—46)

This invention relates to fish lures or artificial bait of the character designed to simulate a herring or other like or similar bait such as salmon, trout and other game fish feed upon.

My improvements are especially directed toward the provision of a lure of the above character in which the hook is slidably carried by the bait-simulating body such that normally only the barbed point of the hook is exposed, from which position under the influence of a fish-strike the hook is slipped to fully expose the same and permit free oscillatory movement unhampered by resistant drag of the lure.

Describing the lure which I provide in more particularity in order to better distinguish from prior developments in which the hook is fast to the trolling line and the bait-simulating body slidable with respect to this line, my invention provides means in which the normally recessed hook is slipped both with respect to the body and the line, the advantage thereof being that the exposure of the hook is positive and not dependent upon a fish forcing the body up the line by the momentum of its strike and also from the fact that the "give" of the hook under the initial strike eliminates a dead-line effect from which a fish can most easily escape when not firmly hooked.

It is a still further and particular object of my invention to provide a fish lure locating the hook in such position that the upper bony rather than the soft lower lip of the fish is penetrated following a strike.

Further objects and advantages will, with the foregoing, become apparent in the course of the following description and claims. The invention consists in the novel construction, adaptation, and combination of parts hereinafter described and claimed.

In the drawing:

Figure 1 is a side elevation representing one embodiment of a lure constructed according to the present invention, the hook being shown in the exposed position which results from a strike.

Fig. 2 is a longitudinal vertical section thereof showing the hook in its normal recessed position exposing only the barbed point.

Fig. 3 is a fragmentary horizontal section.

Fig. 4 is a transverse vertical section taken on the line 4—4 of Fig. 2; and

Fig. 5 is a detail side elevational view representing a modified form of hook-and-line slip coupling.

Having reference to the drawing the numeral 6 denotes the body of a fish lure shown in the simulation of a herring or other small food fish, the body being formed with a center cavity extending the length of the same and being connected by a fixed rod 8 and an intervening swivel 7 to a trolling line 10.

Said rod 8, desirably of stainless steel and U-shaped in plan configuration, has its connecting cross member received through one eye of the swivel and its parallel arms extending rearwardly through the nose of the body into the cavity where, at the approximate mid-length of the body, the same are yoked in a sleeve 11 and have their ends 8' fixedly hooked over the edge of the latter. Welding, as at 12, is employed to secure the body to the rod.

I denote the hook by 13 and attach the eye 13' thereof in the loop-forming cross member of a U-shaped rod 14 complementing said rod 8, this latter rod 14 also having engagement with the sleeve but being slidable relative thereto with its ends 14' being hooked in a manner similar to the ends 8' to prevent withdrawal from the sleeve.

The tail portion of the body is longitudinally slotted, as at 6', and in this slot is received the bill portion of the hook when recessing the hook in the body. It is particularly advantageous that the barbed point of the hook which is exposed through the slot have a slight upward cant as indicated in Fig. 2 and this I accomplish by cutting away the body shell at the base of the tail, dropping a portion of the hook's shank through this opening and resting the shank at its approximate mid-length on the wall defining the forward extremity of the cut.

Referring to the modified disclosure of Fig. 5, it will be seen that a pair of sleeves 11' and 11" are employed, the one being suitably fixed to the terminals of the rod 8 and having free sliding movement with respect to the rod 14 and the other being suitably fixed to the terminals of the rod 14 and having free sliding movement with respect to the rod 8. The telescoping embodiment represented in Fig. 5 is preferred over the slightly more simple disclosure of Figs. 1 through 4 in that it reduces frictional wear between rod 14 and sleeve 11 due to the guiding function of the added sleeve.

While not detailed in the drawing I wish to point out that the nose of the body should desirably lie at a slight angle relative to the principal longitudinal center line of the lure, a design feature which causes the body to zig-zag through the complementary heeling action of the tail.

The invention should be clear from the foregoing description and while I have necessarily had reference therein to the illustrated embodiments it is believed obvious that numerous modifications might be resorted to without departing from the spirit of the inventive contribution to the art of fish lures. I intend that the hereto annexed claims be given a scope in their interpretation commensurate with the state of the advance in such art.

What I claim, is:

1. In a fish lure, a bait-simulating body adapted to be connected with a trolling line, and a hook-carrying member telescopically supported in relation to the body for movement of the shank of the hook from a housed to an exposed position relative to the body.

2. In a fish lure, a member arranged to be connected to a trolling line, a member complementary thereto arranged to carry a hook and supported by the first-named member for relative sliding movement, and a bait-simulating body housing said members and permitting sliding movement of the last-named member from a position fully exposing the hook to a position concealing the shank with the point of the hook exposed.

3. In a fish lure, a bait-simulating body arranged for connection with a trolling line, a body-housed member arranged to carry a hook thereon, and connection between said body and member permitting movement of the latter from a position fully exposing the hook to a position concealing the shank of the hook with the point thereof exposed.

4. In fishing tackle, a pair of members each formed from a rod turned upon itself to provide parallel legs with a connecting cross-arm at one end thereof, the members being arranged to have the cross-arm of one disposed at the end thereof opposite from the cross-arm of the other member, and a sleeve carried by one and slidably fitting the parallel legs of the other member to permit telescoping movement as between the same, the cross-arms of said members acting to engage associated fishing tackle for securing the fishing tackle for limited sliding movement.

5. In a fish lure, in combination, a pair of telescopically arranged members each of which provides a pair of parallel rods with a cross-arm at one end to connect the same, the cross-arm of one of said members being disposed at the end thereof opposite from the cross-arm of the other member, one of said cross-arms being arranged for connection with a trolling line, a hook having its eye engaged over the other cross-arm, and a bait-simulating body fixed to the line-engaging rods and formed relative to the hook-engaging rods to fully expose the hook in the expanded position of the members and house the hook with the point thereof exposed in the telescoped position of the members.

6. The structure defined in claim 5 wherein the body is formed to position the hook in the housed location thereof perpendicularly and with the exposed point canted upwardly from the body.

MATTI NIEMI.